United States Patent
Baughman et al.

(10) Patent No.: US 11,681,876 B2
(45) Date of Patent: Jun. 20, 2023

(54) CASCADED FACT-BASED SUMMARIZATION

(71) Applicant: International Business Machines Corporation, Armonk, NY (US)

(72) Inventors: Aaron K Baughman, Cary, NC (US); Sai Krishna Reddy Gudimetla, Jersey City, NJ (US); Nicholas Michael Wilkin, Atlanta, GA (US); Guy Feigenblat, Givatayim (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 320 days.

(21) Appl. No.: 17/077,082

(22) Filed: Oct. 22, 2020

(65) Prior Publication Data
US 2022/0129636 A1    Apr. 28, 2022

(51) Int. Cl.
*G06F 40/30*    (2020.01)
*G06N 20/00*    (2019.01)
(Continued)

(52) U.S. Cl.
CPC .......... *G06F 40/30* (2020.01); *G06F 16/245* (2019.01); *G06N 20/00* (2019.01); *G06Q 30/04* (2013.01); *G06Q 50/01* (2013.01); *G06Q 50/26* (2013.01)

(58) Field of Classification Search
CPC ...... G06F 40/30; G06F 16/245; G06F 16/248; G06F 40/56; G06N 20/00; G06N 3/006;
(Continued)

(56) References Cited

U.S. PATENT DOCUMENTS

| 8,473,279 B2 | 6/2013 | Al-Shammari |
| 9,047,283 B1 | 6/2015 | Zhang et al. |

(Continued)

FOREIGN PATENT DOCUMENTS

WO    2008100849 A3    8/2008

OTHER PUBLICATIONS

Karadzhov, G., Nakov, P., Villodre, L.M., Barrón-Cedeño, A., & Koychev, I. (2017). Fully Automated Fact Checking Using External Sources. ArXiv, abs/1710.00341. (Year: 2017).*

(Continued)

*Primary Examiner* — Bhavesh M Mehta
*Assistant Examiner* — Philip H Lam
(74) *Attorney, Agent, or Firm* — Garg Law Firm, PLLC; Rakesh Garg; Michael O'Keefe

(57) ABSTRACT

An embodiment calculates a point of view (POV) value for a subportion of an item of media content, including evaluating user inputs related to an automatically detected POV of the subportion of the item. The embodiment also calculates a non-factual cost for the subportion of the item indicative of an amount of the subportion of the item that lacks support in a fact-based corpora. The embodiment also performs a cascaded summarization process comprising generating a summary of the item using the subportion of the item and a summarization technique, analyzing the summary using a fact-checking algorithm to determine whether the summary satisfies a factual score threshold, and performing a next iteration of the cascaded summarization process while the summary fails to satisfy the factual score threshold. The embodiment also communicates a summary satisfying the factual score threshold to a user device.

19 Claims, 9 Drawing Sheets

(51) Int. Cl.
  *G06F 16/245* (2019.01)
  *G06Q 30/04* (2012.01)
  *G06Q 50/26* (2012.01)
  *G06Q 50/00* (2012.01)

(58) Field of Classification Search
  CPC ........ G06N 3/0454; G06N 3/08; G06N 3/045; G06Q 30/04; G06Q 50/01; G06Q 50/26; G06Q 20/145
  See application file for complete search history.

(56) References Cited

U.S. PATENT DOCUMENTS

| | | | |
|---|---|---|---|
| 9,860,337 B1 | 1/2018 | Brown et al. | |
| 10,607,253 B1* | 3/2020 | Shachar | G06Q 30/0244 |
| 2008/0319983 A1* | 12/2008 | Meadows | G06F 16/273 707/999.005 |
| 2012/0297179 A1* | 11/2012 | Lirbank | G06F 9/4416 709/221 |
| 2014/0164302 A1* | 6/2014 | Di Fabbrizio | G06N 5/02 706/46 |
| 2016/0378876 A1* | 12/2016 | Myslinski | G06F 40/30 707/722 |
| 2018/0011931 A1* | 1/2018 | Modani | G06F 40/211 |
| 2018/0357239 A1 | 12/2018 | Alonso et al. | |
| 2019/0163792 A1 | 5/2019 | Gordon et al. | |
| 2019/0332666 A1* | 10/2019 | Dadachev | G06F 40/284 |
| 2021/0304223 A1* | 9/2021 | Poli | H04N 21/4826 |
| 2021/0365773 A1* | 11/2021 | Subramanian | G06N 3/0445 |

OTHER PUBLICATIONS

Rahman et al., A survey on existing extractive techniques for query-based text summarization, 2015 International Symposium on Advanced Computing and Communication (ISACC).

Jo et al., Validation of Graph Based K Nearest Neighbor for Summarizing News Articles, 2019 International Conference on Green and Human Information Technology (ICGHIT).

Feng et al., Memory-Based Extractive Summarization, 2018 3rd International Conference on Mechanical, Control and Computer Engineering (ICMCCE), 2018.

Goodrich et al., Assessing The Factual Accuracy of Generated Text, KDD '19, Aug. 4-8, 2019, Anchorage, AK, USA.

Zhai et al., Text Data Management and Analysis: A Practical Introduction to Information Retrieval and Text Mining, Jun. 2016.

Mithun et al., Summarizing blog entries versus news texts, Sep. 2009.

* cited by examiner

CASCADED FACT-BASED SUMMARIZATION

BACKGROUND

The present invention relates generally to a method, system, and computer program product for summarizing media content. More particularly, the present invention relates to a method, system, and computer program product for cascaded fact-based summarization of media content.

Natural language processing (NLP) may relate to a field within computer science dealing with the analysis of natural language text by a computer. Natural language processing may have applications in various categories, such as syntax, semantics, discourse, and speech. Various applications within the mentioned categories include text-to-speech, discourse analysis, relationship extraction, natural language generation, sentiment analysis, parsing, word segmentation, terminology extraction, machine translation, and summarization.

SUMMARY

The illustrative embodiments provide for cascaded fact-based summarization of media content. An embodiment includes calculating a point of view (POV) value for a subportion of an item of media content, where the calculating of the POV includes evaluating user inputs related to an automatically detected POV of the subportion of the item of media content. The embodiment also includes calculating a non-factual cost for the subportion of the item of media content indicative of an amount of the subportion of the item of media content that lacks support in a fact-based corpora. The embodiment also includes performing a cascaded summarization process comprising at least one iteration of: generating a summary of the item of media content using the subportion of the item of media content and a summarization technique, where each iteration of the cascaded summarization process uses a different summarization technique from other iterations of the cascaded summarization process; analyzing the summary using a fact-checking algorithm, where the analyzing determines whether the summary satisfies a factual score threshold; and performing a next iteration of the cascaded summarization process while the summary fails to satisfy the factual score threshold and at least one of a predetermined set of summarization techniques remains unused. The embodiment also includes communicating, responsive to a summary from any iteration of the cascaded summarization process satisfying the factual score threshold, the summary to a user device in response to an inquiry from the user. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
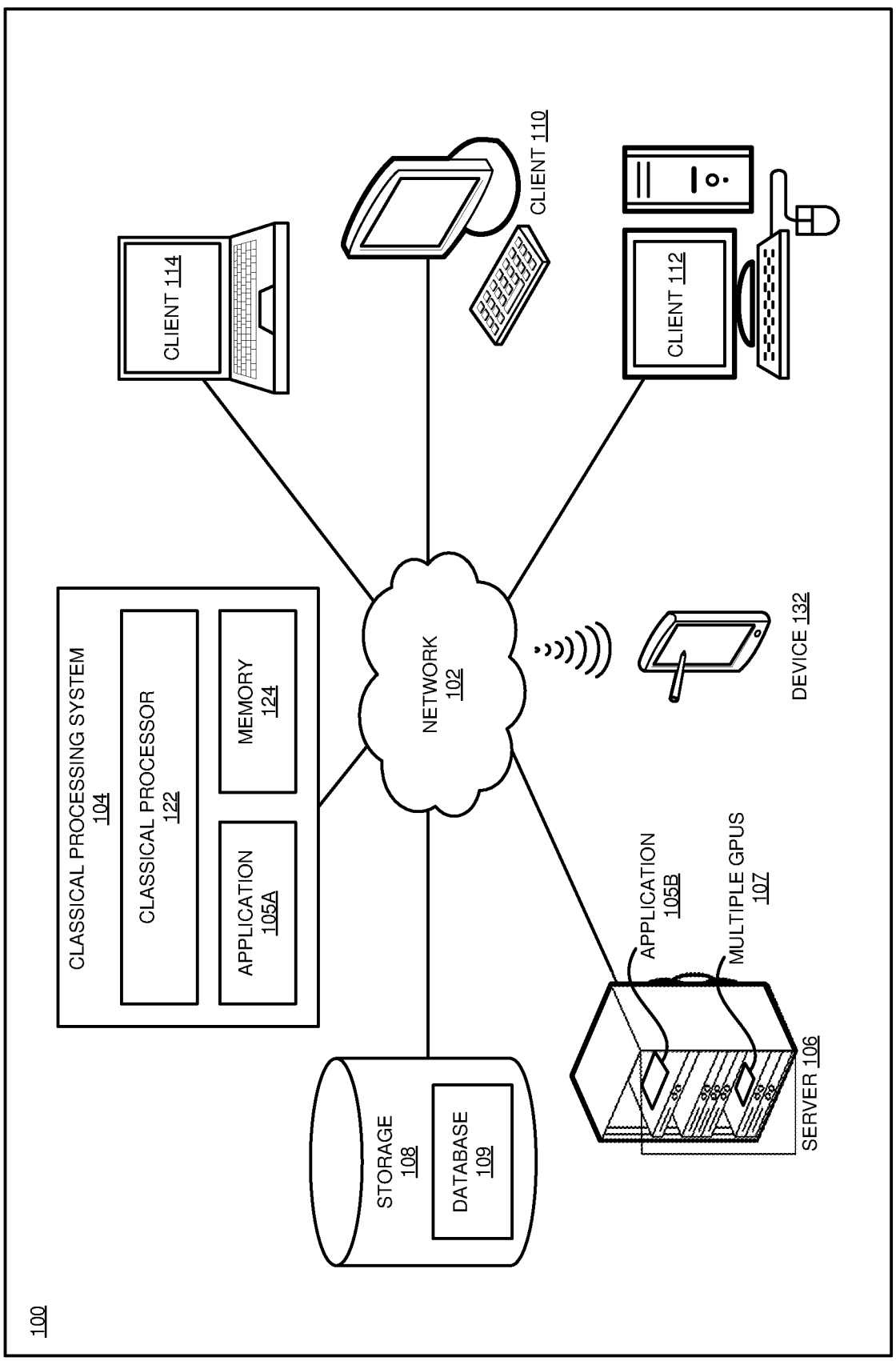
FIG. 1 depicts a block diagram of a network of data processing systems in which illustrative embodiments may be implemented.

The volume of information available for consumption continues to grow at an unprecedented pace. For example, recent years have seen a dramatic growth of natural language text data, including web pages, news articles, scientific literature, emails, enterprise documents, and social media (such as blog articles, forum posts, product reviews, and tweets). This has led to an increasing demand for powerful software tools to help people manage and analyze vast amounts of text data effectively and efficiently, for example by personalizing news and streams of events from several different sources.

One approach to addressing this demand involves the implementation of automatic data summarization, which typically includes providing a summary of key elements of an input corpus of content, such as human-readable text. The primary goal of such summarizations is to find a representative subset of the input content that contains relevant information of the entire set. Unlike data generated by a computer system or sensors, text data is usually generated directly by humans, and captures semantically rich content. As such, text data is especially valuable for discovering knowledge about human opinions and preferences, in addition to many other kinds of knowledge that we encode in text. As a result, much of the information that is consumed by users originates from polarized sources, making it easy for consumers to primarily consume media that reinforces their own beliefs without considering different perspectives.

A "summarization technique" as used herein refers to an approach to automated summarization. In general, there are three summarization techniques for automated summarization: abstractive summarization, extractive summarization, and hybrid summarization. Abstractive summarization refers to the generation of novel text from source documents that are under the process of summarization. For example, some abstractive approaches build an internal semantic representation of subportions of a source document and then use various natural language processing (NLP) techniques to create a summary that is similar to what a human might generate. Extractive summarization refers to summarization by extracting the most important parts of a document and assembling them into a summary. Thus, extractive summarization techniques typically select a subset of existing words, phrases, or sentences in an original corpus of text from a source document to create a summary of the source document. Hybrid summarization is a combination of parts of both abstractive and extractive summarization techniques such that both new and extracted text is found within a summary.

These summarization techniques typically take into account variables such as the length, writing style, and syntax of an input corpus. However, these summarization techniques naively do not consider the veracity of summarization points in candidate sentences. Additionally, none of these summarization techniques is preferable to all users in all situations. For example, different users may have differing opinions as to which style of writing and summarizing they prefer, which some users favoring direct excerpts and other users preferring a summary that re-phrases key points. Also, a user may prefer one summarization technique over another depending on the user's familiarity with a particular topic or depending on the contentiousness of the topic.

Illustrative embodiments address shortcomings of prior summarization systems by implementing a cascaded summarization approach that will generate one or more summaries of items of media content according to different summarization techniques and evaluate each summary based on user preferences. Also, illustrative embodiments provide users with topic summaries of items of media content based on an accumulation of different perspectives. Persons practicing the invention should be mindful of and respect the copyrights in the source materials.

"Media content," as used herein, includes any form of content, including content in the form of text, audio, or video. An "item of media content," as used herein, includes any unit of media content, such as a new article, a blog entry, a video, or a podcast episode. A "subportion of an item of media content," as used herein, includes any portion or subdivision of an item of media content, such as a sentence, paragraph, video segment, or audio segment.

The topic summaries from multiple perspectives potentially provide an overall neutral point of view or at least expose a user to multiple different perspectives in a comprehensive summary about a topic. Illustrative embodiments also implement a fact-based summarization approach to each of the abstractive, hybrid and extractive summarization techniques. The text that is generated or extracted is weighted by fact content and point of view importance. In this way, disclosed embodiments provide factually sound information derived from a variety of different perspectives for a topic.

Illustrative embodiments employ natural language processing (NLP), which is an application of Artificial Neural Network (ANN) processing. An ANN—also referred to simply as a neural network—is a computing system made up of a number of simple, highly interconnected processing elements (nodes), which process information by their dynamic state response to external inputs. An ANN is loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior.

For NLP applications, neural networks are used for a variety of tasks such as text classification, speech recognition, semantic parsing and question answering. However, neural networks are mathematical algorithms that accept numbers rather than strings of text as inputs. In order to use a neural network with text, the text is first converted to numbers. The ability to do so marks an important advancement in computer science.

There are a variety of techniques and algorithms that produce numerical representations of text. These techniques generally seek to find a numerical representations for words that an NLP system can understand. For example, vectorization involves using an embedding to derive vector representations of words. Vectorization can be used to generate vectors for words in a body of text where the vectors are numerical distributions of how probable it is that a given word will appear in the context of another word. While specific examples of embeddings and vectorization techniques are described in connection with the illustrative embodiments, alternative embodiments may utilize alternative embeddings and vectorization techniques.

In exemplary embodiments, a media summarization application includes a POV analysis module, a factual analysis module, a cascaded summarization module, and a publishing module. In alternative embodiments, the application can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the POV analysis module produces an argumentative summarization from media content. In some embodiments, the POV analysis module extracts subportions of items of the media content. For example, in some embodiments, the items of media content are news articles and blog entries, and the POV analysis module divides the items of media content into phrases or sentences. In some embodiments, the POV analysis module uses an attention mechanism neural network that has stacked encoders and decoders to generate encodings from extracted subportions of items of media content.

In some embodiments, the POV analysis module vectorizes a topic by an embedding. Also, in some embodiments, the POV analysis module generates a vector from user input and/or sensed user actions, such as values representative of a user's indication as to the importance of a topic or a detected or sensed amount of time a user spends within the vicinity of a sentence, which contribute to the detected importance of the sentence. In such embodiments, this user vector helps to increase class spread between POVs for the content most important to the user.

In some embodiments, the POV analysis module calculates a POV value for each extracted subportion of an item of media content. In some embodiments, the POV analysis module calculates the POV inputs using a polarity classifier and a nested deep learning algorithm. In some embodiments, the POV analysis module inputs an encoded subportion of an item of media content into a polarity classifier, which produces a distribution of sentiment polarity of a topic. The output is fed into a nested deep learning algorithm, along with the vectorized topic and user vector. The deep learning algorithm aims to estimate the probability of an opinion word, or POV, given a target topic embedding and a sentiment polarity.

In some embodiments, the factual analysis module receives or fetches media content. In some embodiments, factual analysis module extracts subportions of items of the media content. For example, in some embodiments, the items of media content are news articles and blog entries, and the factual analysis module divides the items of media content into phrases or sentences.

In the illustrated embodiment, a fact-based corpora is factual data that has been vetted by humans or from knowledge sources, such as scholarly peer-reviewed publications, trade journals, encyclopedias, government factbooks and census databases. In some embodiments, the fact-based corpora also includes attention mechanism embeddings for each corpus stored with the fact-based corpora. In the illustrated embodiment, the factual analysis module applies the same fact-based embedding corpora to the extracted subportions of media content to get a fact-checking embedding of the subportion of the item of media content.

In the illustrated embodiment, the factual analysis module queries the fact-based embeddings corpora for a fact-based embedding that most closely matches the fact-checking embedding of the subportion of the item of media content. The factual analysis module then calculates calculating a similarity, such as cosine similarity, between the fact-checking embedding and the fact-based embedding. The factual analysis module calculates and outputs a non-factual cost for each of the subportions of the item of media content indicative of an amount of each subportion that lacks support in a fact-based corpora. In some embodiments, the factual analysis module checks to determine if a user sentence is factual based on a number of facts are close to the sentence. In some embodiments, this average degree of similarity and the number of supporting facts contribute to a cost of the subportion. In some embodiments, the cost of the sentence becomes 1-Fact assessment.

In some embodiments, the cascaded summarization module receives the POV value, for example as output by the POV analysis module, and non-factual cost, for example as output by the factual analysis module. In some embodiments, the cascaded summarization module also allows a user to input an indication of an amount of risk they are willing to take with respect to non-fact information being included within a summary for a POV.

In some embodiments, the cascaded summarization module selects from among the multiple extracted subportions of the item of media content for use in generating a summary. In some embodiments, the cascaded summarization module uses an equation inspired by the Maximal Marginal Relevance (MMR) equation shown below as expression (1), which implements a trade-off between non-factual cost and the value of the POV.

$$MMR \overset{def}{=} \max_{S_i \in D \setminus Sum} \left[ \lambda(sim_i(S_i, Q)) - \left((1-\lambda) \max_{S_j \in Sum} sim_2(S_i, S_j)\right) \right] \quad (1)$$

In expression (1), where, Q=non-factual cost, D=Set of subportions of item of media content, S=POV value, D\Sum=set of unselected subportions in D, and $\lambda$=a constant in a range of 0 to 1. In some embodiments, $\lambda$ is dependent on the system because different contexts require different truth values. In some embodiments, the cascaded summarization module runs a knap sack algorithm modified by expression (1) hat trades off the non-factual cost and value of the POV.

In some embodiments, the resulting output from expression (1) is a set of subportions that both maximize the POV value and minimize the non-factual cost. In some embodiments, the number of subportions is related to the maximum non-factual risk the user is willing to take. In some embodiments, the cascaded summarization module outputs a list of subportions associated with a particular point of view, which may be used to synthesize a narration. In the illustrated embodiment, the cascaded summarization module uses a cascade of techniques that run multiple times for each desired POV, which in turn, changes the valuation associated with each subportion.

In the illustrated embodiment, the cascaded summarization module generates an abstractive summarization using the subportions output from the MMR for each POV. The cascaded summarization module then applies a fact checking algorithm to the abstractive summarization. Since the original subportions are already traded off with POV value and fact checking, the original sentences may be treated as factual. The cascaded summarization module finds the word embedding for the entire abstractive summarization. The cascaded summarization module then gathers supporting factual embeddings and includes that within the second set of auto encoder and decoders. The cascaded summarization module uses this information to calculate a factual score for the abstractive summarization and compare the factual score to a threshold value, for example a user-selected factual threshold value.

In some embodiments, if the abstractive summarization satisfies the threshold value, then the cascaded summarization module transmits the abstractive summarization to the publishing module, which formats and transmits the abstractive summarization to the user, for example by transmitting the abstractive summarization as a publishable narration for display by the user device.

On the other hand, if the abstractive summarization does not satisfy the threshold value, then the subportions output from the MMR are used by a hybrid narration algorithm that uses reinforcement learning to reward sentences that have a mix of extractive base and abstractive base. In some embodiments, the cascaded summarization module also uses a factual data store to amplify or dampen the reward within the reinforcement policy. The cascaded summarization module then applies a fact checking algorithm to the hybrid summarization. Since the original subportions are already traded off with POV value and fact checking, the original sentences may be treated as factual. The cascaded summarization module finds the word embedding for the entire hybrid summarization. The cascaded summarization module then gathers supporting factual embeddings and includes that within a second set of auto encoder and decoders. The cascaded summarization module uses this information to calculate a factual score for the hybrid summarization and compare the factual score to a threshold value, for example a user-selected factual threshold value.

In some embodiments, if the hybrid summarization satisfies the threshold value, then the cascaded summarization module transmits the hybrid summarization to the publishing module, which formats and transmits the hybrid summarization to the user, for example by transmitting the hybrid summarization as a publishable narration for display by the user device.

On the other hand, if the hybrid summarization does not satisfy the threshold value, then the subportions output from the MMR are used by an extractive narration algorithm that uses reinforcement learning to reward sentences that have a mix of extractive base and abstractive base. In some embodiments, the cascaded summarization module extracts the most important POVs and aggregates subportions into an extractive narration. In addition, each extracted subportion is tagged with a fact-based score. The then receives the extractive summarization and applies a fact checking algorithm to the extractive summarization. Since the original subportions are already traded off with POV value and fact checking, the original subportions may be treated as factual. The cascaded summarization module finds the word embedding for the entire extractive summarization. The cascaded summarization module then gathers supporting factual embeddings and includes that within the second set of auto encoder and decoders. The cascaded summarization module uses this information to calculate a factual score for the extractive summarization and compare the factual score to a threshold value, for example a user-selected factual threshold value.

In some embodiments, if the extractive summarization satisfies the threshold value, then the cascaded summarization module transmits the extractive summarization to the publishing module, which formats and transmits the extractive summarization to the user, for example by transmitting the extractive summarization as a publishable narration for display by the user device.

On the other hand, if the extractive summarization does not satisfy the threshold value, then the subportions output from the MMR are discarded. In alternative embodiments, an extractive summarization is provided to the user for viewing regardless of the factual threshold value. In some such embodiments, if the extractive summarization does not satisfy the threshold value, the extractive summarization is provided to the user for viewing with an indication to the user that the extractive summarization does not satisfy the factual threshold.

In alternative embodiments, the order in which the different summarization techniques are generated may differ from the illustrated embodiment, for example the extractive narration and/or hybrid narration may be prepared before the abstractive narration. Also, in alternative embodiments, alternative narration techniques may be generated in place of, or in addition to, the abstractive, hybrid, and/or extractive summarization techniques. Thus, in some embodiments, the cascaded summarization module performs a cascaded summarization process comprising at least one iteration of generating a summary of the item of media content using the subportion of the item of media content and a summarization technique, where each iteration of the cascaded summarization process uses a different summarization technique from other iterations of the cascaded summarization process; analyzing the summary using a fact-checking algorithm, where the analyzing determines whether the summary satisfies a factual score threshold; and performing a next iteration of the cascaded summarization process while the summary fails to satisfy the factual score threshold and at least one of a predetermined set of summarization techniques remains unused.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
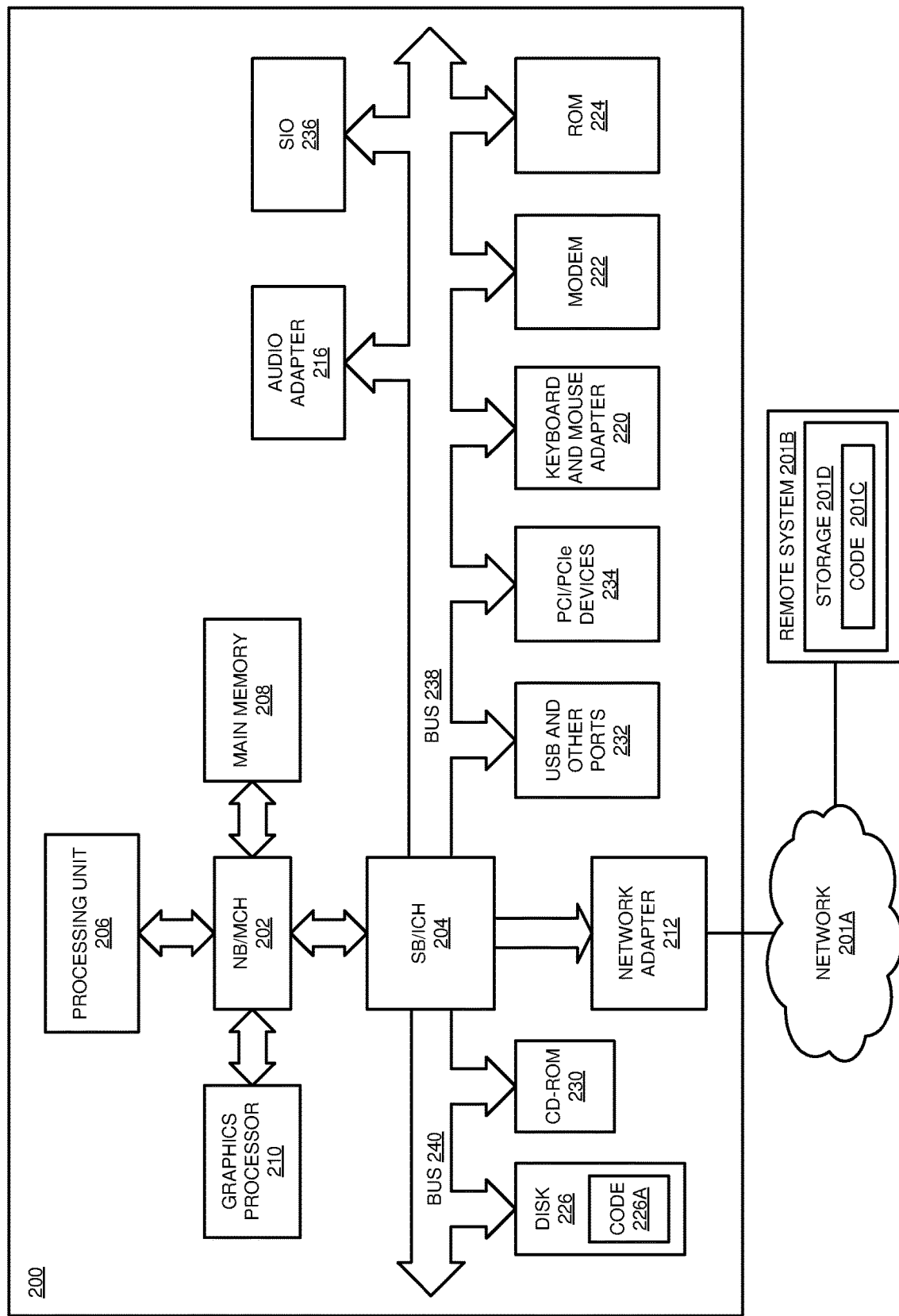
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein of a matrix selection application, machine-learning application, or other data processor function described herein in accordance with one or more embodiments. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of application 105A of data processing system 104 and application 105B of server 106 implements an embodiment of a neural network, such as a deep neural network (DNN), as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions are located or executed for implementing matrix selection applications, machine-learning applications, or other data processor functions described herein in accordance with one or more embodiments.

Data processing system 200 is also representative of a conventional data processing system or a configuration therein, such as conventional data processing system 132 in FIG. 1 in which computer usable program code or instructions are located or executed for implementing matrix selection applications, machine-learning applications, or other data processor functions described herein in accordance with one or more embodiments. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A and 105B in FIG. 1, such as instructions for implementing matrix selection applications, machine-learning applications, or other data processor functions described herein in accordance with one or more embodiments, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a—virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
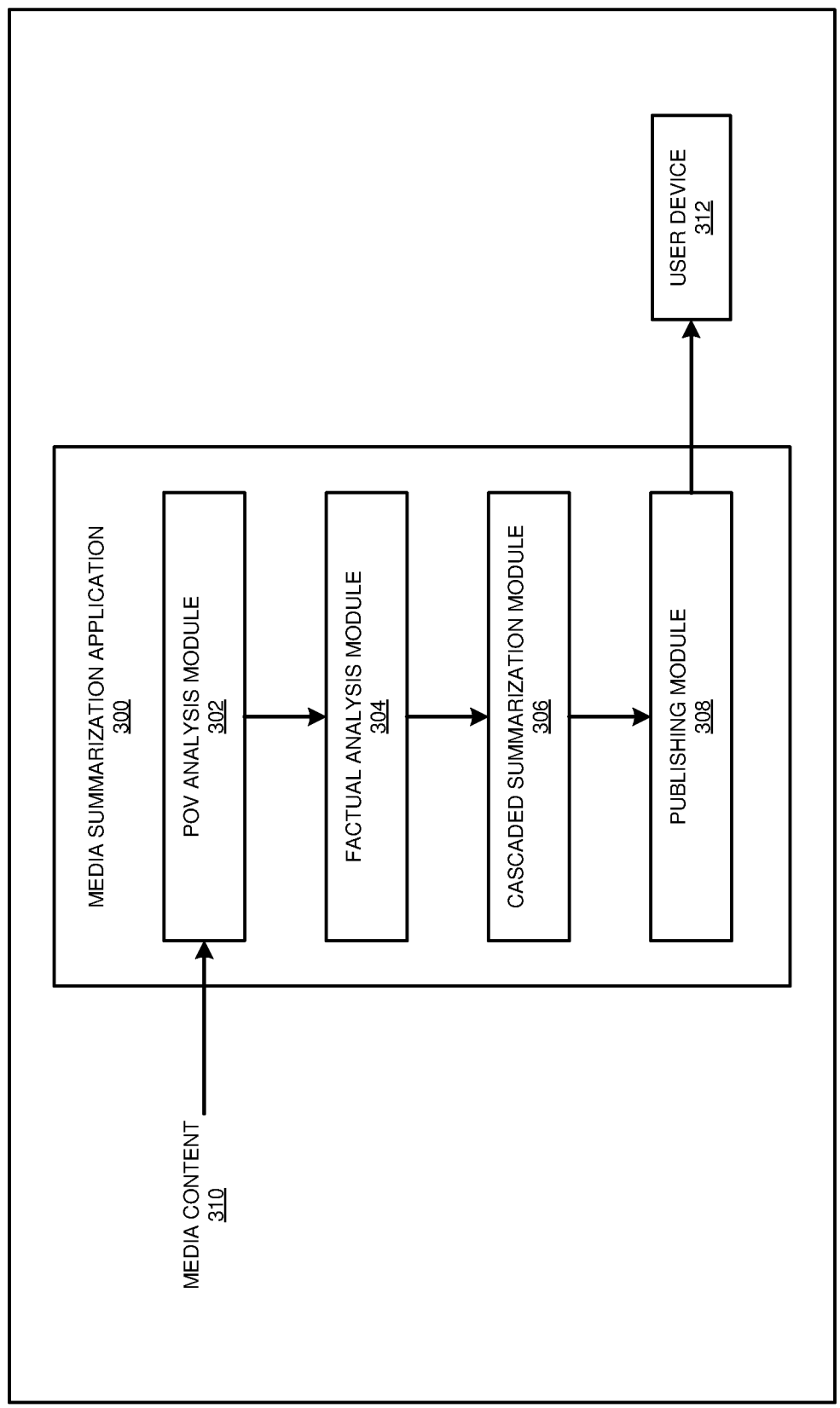
FIG. 3 depicts a block diagram of an example media summarization application in accordance with an illustrative embodiment.

With reference to FIG. 3, this figure depicts a block diagram of an example media summarization application 300 in accordance with an illustrative embodiment. In a particular embodiment, example media summarization application 300 is an example of application 105a/105b of FIG. 1.

In some embodiments, the application 300 includes a POV analysis module 302, a factual analysis module 304, a cascaded summarization module 306, and a publishing module 308. In alternative embodiments, the application 300 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the POV analysis module 302 produces an argumentative summarization from media content 310. In some embodiments, the POV analysis module 302 extracts subportions of items of the media content 310. For example, in some embodiments, the items of media content 310 are news articles and blog entries, and the POV analysis module 302 divides the items of media content 310 into phrases or sentences. In some embodiments, the POV analysis module 302 uses an attention mechanism neural network that has stacked encoders and decoders to generate encodings from extracted subportions of items of media content 310.

In some embodiments, the POV analysis module 302 vectorizes a topic by an embedding. Also, in some embodiments, the POV analysis module 302 generates a vector from user input and/or sensed user actions, such as values representative of a user's indication as to the importance of a topic or a detected or sensed amount of time a user spends within the vicinity of a sentence, which contribute to the detected importance of the sentence. In such embodiments, this user vector helps to increase class spread between POVs for the content most important to the user.

In some embodiments, the POV analysis module 302 calculates a POV value for each extracted subportion of an item of media content. In some embodiments, the POV analysis module 302 calculates the POV inputs using a polarity classifier and a nested deep learning algorithm. In some embodiments, the POV analysis module 302 inputs an encoded subportion of an item of media content into a polarity classifier, which produces a distribution of sentiment polarity of a topic. The output is fed into a nested deep learning algorithm, along with the vectorized topic and user vector. The deep learning algorithm aims to estimate the probability of an opinion word, or POV, given a target topic embedding and a sentiment polarity.

In some embodiments, the factual analysis module 304 receives or fetches media content 310. In some embodiments, factual analysis module 304 extracts subportions of items of the media content 310. For example, in some embodiments, the items of media content 310 are news articles and blog entries, and the factual analysis module 304 divides the items of media content 310 into phrases or sentences.

In the illustrated embodiment, a fact-based corpora (e.g., such as fact-based corpora 512 of FIG. 5) is factual data that has been vetted by humans or from knowledge sources, such as scholarly peer-reviewed publications, trade journals, encyclopedias, government factbooks and census databases. In some embodiments, the fact-based corpora also includes attention mechanism embeddings for each corpus stored with the fact-based corpora. In the illustrated embodiment, the factual analysis module 304 applies the same fact-based embedding corpora to the extracted subportions of media content to get a fact-checking embedding of the subportion of the item of media content.

In the illustrated embodiment, the factual analysis module 304 queries the fact-based embeddings corpora for a fact-based embedding that most closely matches the fact-checking embedding of the subportion of the item of media content. The factual analysis module 304 then calculates calculating a similarity, such as cosine similarity, between the fact-checking embedding and the fact-based embedding. The factual analysis module 304 calculates and outputs a non-factual cost for each of the subportions of the item of media content indicative of an amount of each subportion that lacks support in a fact-based corpora. In some embodiments, the factual analysis module 304 checks to determine if a user sentence is factual based on a number of facts are close to the sentence. In some embodiments, this average degree of similarity and the number of supporting facts contribute to a cost of the subportion. In some embodiments, the cost of the sentence becomes 1-Fact assessment.

In some embodiments, the cascaded summarization module 306 receives the POV value, for example as output by the POV analysis module 302, and non-factual cost, for example as output by the factual analysis module 304. In some embodiments, the cascaded summarization module 306 also allows a user to input an indication of an amount of risk they are willing to take with respect to non-fact information being included within a summary for a POV.

In some embodiments, the cascaded summarization module 306 selects from among the multiple extracted subportions of the item of media content for use in generating a summary. In some embodiments, the cascaded summarization module 306 uses an equation inspired by the Maximal Marginal Relevance (MMR) equation shown below as expression (1), which implements a trade-off between non-factual cost and the value of the POV.

$$MMR \stackrel{def}{=} \max_{S_i \in D \backslash Sum} \left[ \lambda(sim_i(S_i, Q)) - \left( (1-\lambda) \max_{S_j \in Sum} sim_2(S_i, S_j) \right) \right] \quad (1)$$

In expression (1), where, Q=non-factual cost, D=Set of subportions of item of media content, S=POV value, D\Sum=set of unselected subportions in D, and λ=a constant in a range of 0 to 1. In some embodiments, λ is dependent on the system because different contexts require different truth values. In some embodiments, the cascaded summarization module 306 runs a knap sack algorithm modified by expression (1) hat trades off the non-factual cost and value of the POV.

In some embodiments, the resulting output from expression (1) is a set of subportions that both maximize the POV value and minimize the non-factual cost. In some embodiments, the number of subportions is related to the maximum non-factual risk the user is willing to take. In some embodiments, the cascaded summarization module 306 outputs a list of subportions associated with a particular point of view, which may be used to synthesize a narration. In the illustrated embodiment, the cascaded summarization module 306 uses a cascade of techniques that run multiple times for each desired POV, which in turn, changes the valuation associated with each subportion.

In the illustrated embodiment, the cascaded summarization module 306 generates an abstractive summarization using the subportions output from the MMR for each POV. The cascaded summarization module 306 then applies a fact checking algorithm to the abstractive summarization. Since the original subportions are already traded off with POV value and fact checking, the original sentences may be treated as factual. The cascaded summarization module 306 finds the word embedding for the entire abstractive summarization. The cascaded summarization module 306 then gathers supporting factual embeddings and includes that within the second set of auto encoder and decoders. The cascaded summarization module 306 uses this information to calculate a factual score for the abstractive summarization and compare the factual score to a threshold value, for example a user-selected factual threshold value.

In some embodiments, if the abstractive summarization satisfies the threshold value, then the cascaded summarization module 306 transmits the abstractive summarization to the publishing module 308, which formats and transmits the abstractive summarization to the user, for example by transmitting the abstractive summarization as a publishable narration for display by the user device 312.

On the other hand, if the abstractive summarization does not satisfy the threshold value, then the subportions output from the MMR are used by a hybrid narration algorithm that uses reinforcement learning to reward sentences that have a mix of extractive base and abstractive base. In some embodiments, the cascaded summarization module 306 also uses a factual data store (e.g., fact-based corpora 512 of FIG. 5) to amplify or dampen the reward within the reinforcement policy. The cascaded summarization module 306 then applies a fact checking algorithm to the hybrid summarization. Since the original subportions are already traded off with POV value and fact checking, the original sentences may be treated as factual. The cascaded summarization module 306 finds the word embedding for the entire hybrid summarization. The cascaded summarization module 306 then gathers supporting factual embeddings and includes that within a second set of auto encoder and decoders. The cascaded summarization module 306 uses this information to calculate a factual score for the hybrid summarization and compare the factual score to a threshold value, for example a user-selected factual threshold value.

In some embodiments, if the hybrid summarization satisfies the threshold value, then the cascaded summarization module 306 transmits the hybrid summarization to the publishing module 308, which formats and transmits the hybrid summarization to the user, for example by transmitting the hybrid summarization as a publishable narration for display by the user device 312.

On the other hand, if the hybrid summarization does not satisfy the threshold value, then the subportions output from the MMR are used by an extractive narration algorithm that uses reinforcement learning to reward sentences that have a mix of extractive base and abstractive base. In some embodiments, the cascaded summarization module 306 extracts the most important POVs and aggregates subportions into an extractive narration. In addition, each extracted subportion is tagged with a fact-based score. The 306 then receives the extractive summarization and applies a fact checking algorithm to the extractive summarization. Since the original subportions are already traded off with POV value and fact checking, the original subportions may be treated as factual. The cascaded summarization module 306 finds the word embedding for the entire extractive summarization. The cascaded summarization module 306 then gathers supporting factual embeddings and includes that within the second set of auto encoder and decoders. The cascaded summarization module 306 uses this information to calculate a factual score for the extractive summarization and compare the factual score to a threshold value, for example a user-selected factual threshold value.

In some embodiments, if the extractive summarization satisfies the threshold value, then the cascaded summarization module 306 transmits the extractive summarization to the publishing module 308, which formats and transmits the extractive summarization to the user, for example by transmitting the extractive summarization as a publishable narration for display by the user device 312.

On the other hand, if the extractive summarization does not satisfy the threshold value, then the subportions output from the MMR are discarded. In alternative embodiments, an extractive summarization is provided to the user for viewing regardless of the factual threshold value. In some such embodiments, if the extractive summarization does not satisfy the threshold value, the extractive summarization is provided to the user for viewing with an indication to the user that the extractive summarization does not satisfy the factual threshold.

In alternative embodiments, the order in which the different summarization techniques are generated may differ from the illustrated embodiment, for example the extractive narration and/or hybrid narration may be prepared before the abstractive narration. Also, in alternative embodiments, alternative narration techniques may be generated in place of, or in addition to, the abstractive, hybrid, and/or extractive summarization techniques. Thus, in some embodiments, the cascaded summarization module 306 performs a cascaded summarization process comprising at least one iteration of generating a summary of the item of media content using the subportion of the item of media content and a summarization technique, where each iteration of the cascaded summarization process uses a different summarization technique from other iterations of the cascaded summarization process; analyzing the summary using a fact-checking algorithm, where the analyzing determines whether the summary satisfies a factual score threshold; and performing a next iteration of the cascaded summarization process while the summary fails to satisfy the factual score threshold and at least one of a predetermined set of summarization techniques remains unused.

Figure 4:
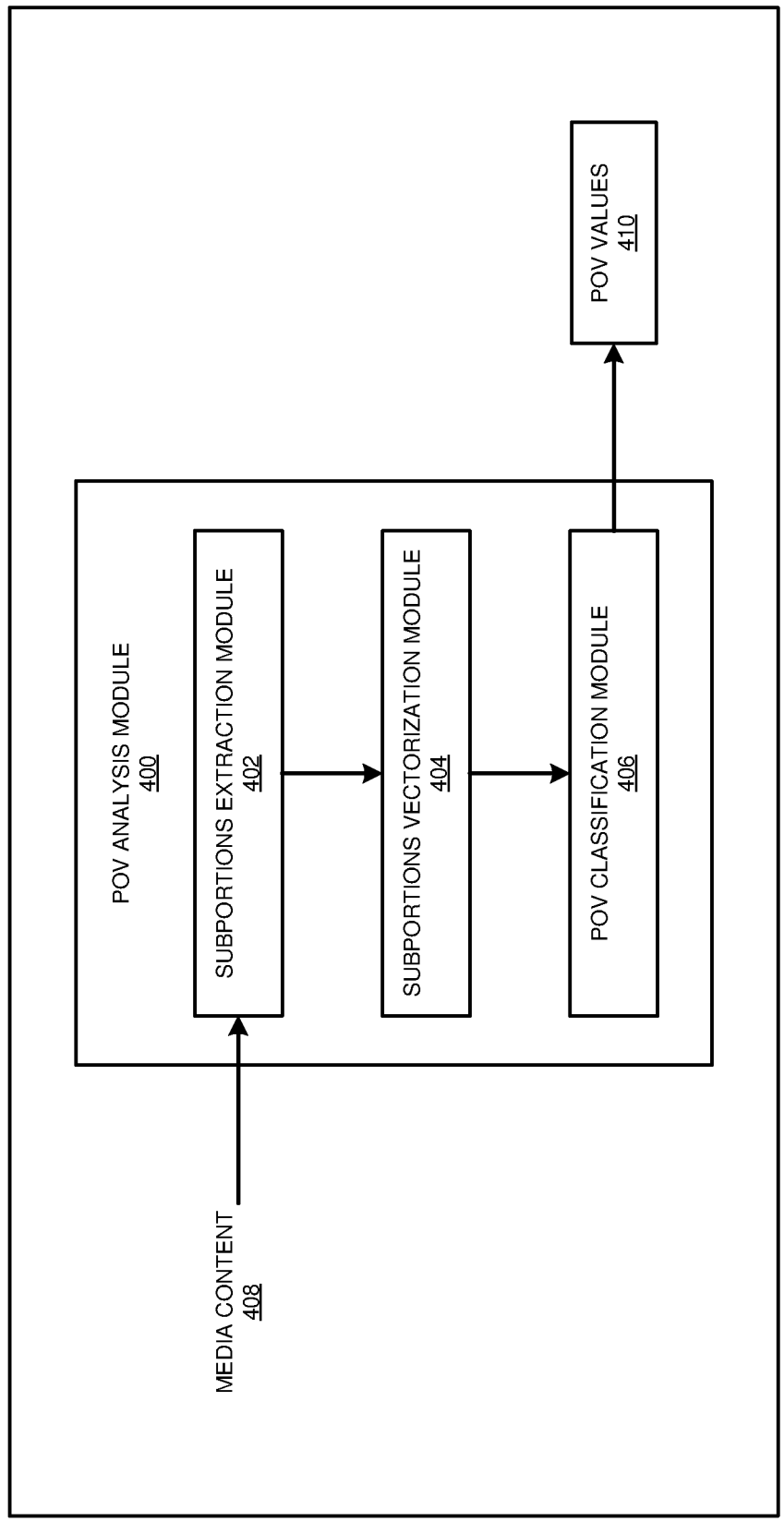
FIG. 4 depicts a block diagram of an example POV analysis module in accordance with an illustrative embodiment.

With reference to FIG. 4, this figure depicts a block diagram of an example POV analysis module 400 in accordance with an illustrative embodiment. In a particular embodiment, example POV analysis module 400 is an example of POV analysis module 302 of FIG. 3.

In the illustrated embodiment, the POV analysis module 400 produces an argumentative summarization from media content 310. In the illustrated embodiment, the POV analysis module 400 includes a subportions extraction module 402, a subportions vectorization module 404, and a POV classification module 406. In alternative embodiments, the POV analysis module 400 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, subportions extraction module 402 receives or fetches media content 408. In some embodiments, subportions extraction module 402 extracts subportions of items of the media content 408. For example, in some embodiments, the items of media content 408 are news articles and blog entries, and the subportions extraction module 402 divides the items of media content 408 into phrases or sentences. In some embodiments, the subportions extraction module 402 uses an attention mechanism neural network that has stacked encoders and decoders to generate encodings from extracted subportions of items of media content 310.

In the illustrated embodiment, the subportions vectorization module 404 vectorizes a topic by an embedding. Also, in some embodiments, the subportions vectorization module 404 generates a vector from user input and/or sensed user actions, such as values representative of a user's indication as to the importance of a topic or a detected or sensed amount of time a user spends within the vicinity of a sentence, which contribute to the detected importance of the sentence. In such embodiments, this user vector helps to increase class spread between POVs for the content most important to the user.

In the illustrated embodiment, the POV classification module 406 calculates a POV value for each extracted subportion of an item of media content. In some embodiments, the POV classification module 406 calculates the POV inputs using a polarity classifier and a nested deep learning algorithm. The POV classification module 406 inputs an encoded subportion of an item of media content into a polarity classifier, which produces a distribution of sentiment polarity of a topic. The output POV value 410 is fed into a nested deep learning algorithm, along with the vectorized topic and user vector. The deep learning algorithm aims to estimate the probability of an opinion word, or POV, given a target topic embedding and a sentiment polarity.

Figure 5:
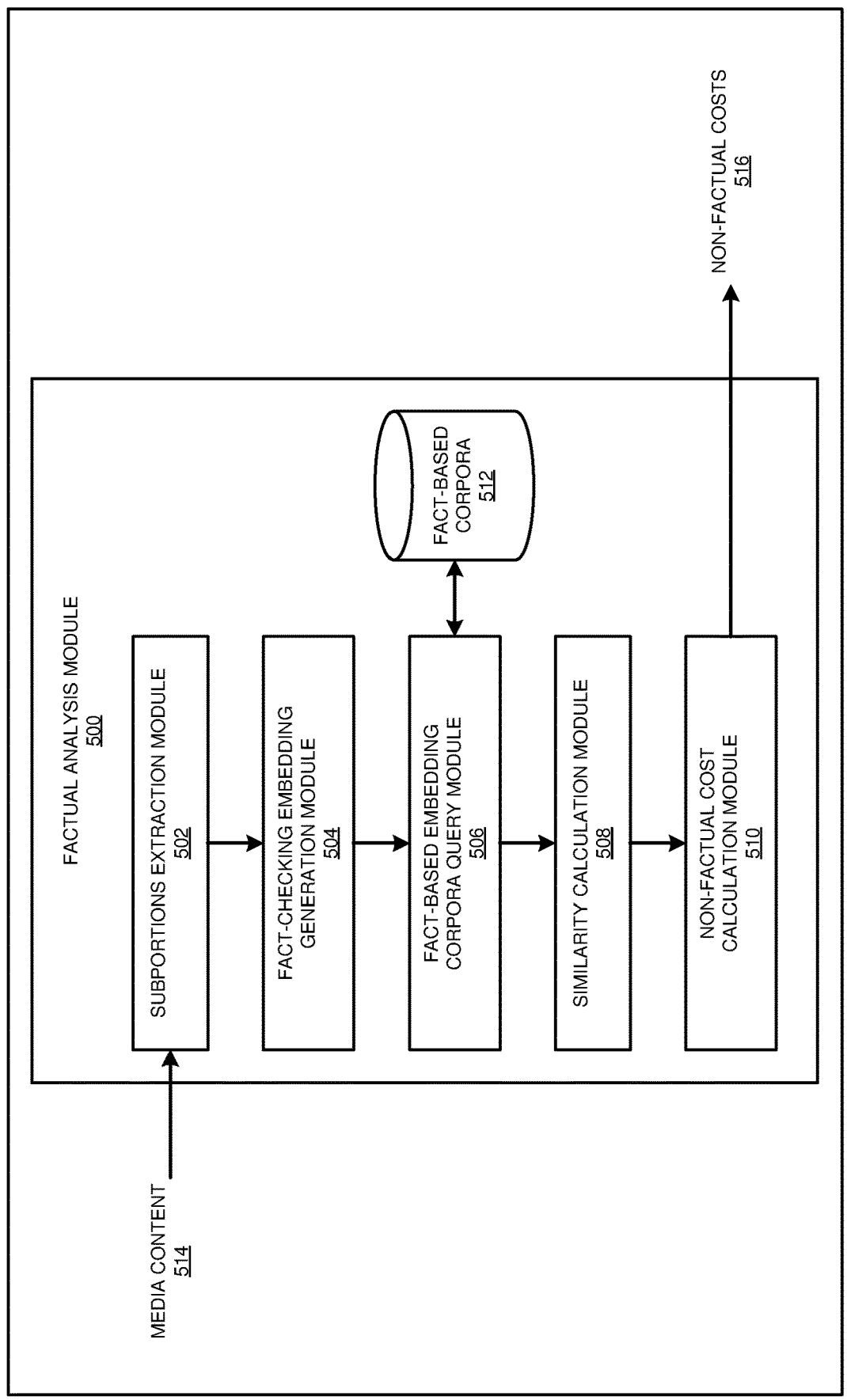
FIG. 5 depicts a block diagram of an example factual analysis module in accordance with an illustrative embodiment.

With reference to FIG. 5, this figure depicts a block diagram of an example factual analysis module 500 in accordance with an illustrative embodiment. In a particular embodiment, example factual analysis module 500 is an example of factual analysis module 304 of FIG. 3.

In some embodiments, the factual analysis module 500 includes a subportions extraction module 502, a fact-checking embedding generation module 504, a fact-based embeddings corpora query module 506, a similarity calculation module 508, a non-factual cost calculation module 510, and memory storing fact-based corpora 512. In alternative embodiments, the factual analysis module 500 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, subportions extraction module 502 receives or fetches media content 514. In some embodiments, subportions extraction module 502 extracts subportions of items of the media content 514. For example, in some embodiments, the items of media content 514 are news articles and blog entries, and the subportions extraction module 502 divides the items of media content 408 into phrases or sentences.

In the illustrated embodiment, the fact-based corpora 512 is factual data that has been vetted by humans or from knowledge sources, such as scholarly peer-reviewed publications, trade journals, encyclopedias, government fact-books and census databases. In some embodiments, the fact-based corpora 512 also includes attention mechanism embeddings for each corpus stored with the fact-based corpora 512. In the illustrated embodiment, the fact-checking embedding generation module 504 applies the same fact-based embedding corpora to the extracted subportions of media content to get a fact-checking embedding of the subportion of the item of media content.

In the illustrated embodiment, the fact-based embeddings corpora query module 506 queries the fact-based embeddings corpora 512 for a fact-based embedding that most closely matches the fact-checking embedding of the subportion of the item of media content. The similarity calculation module 508 then calculates calculating a similarity, such as cosine similarity, between the fact-checking embedding and the fact-based embedding. The non-factual cost calculation module 510 calculates and outputs a non-factual cost 516 for each of the subportions of the item of media content indicative of an amount of each subportion that lacks support in a fact-based corpora 512. In some embodiments, the non-factual cost calculation module 510 checks to determine if a user sentence is factual based on a number of facts are close to the sentence. In some embodiments, this average degree of similarity and the number of supporting facts contribute to a cost of the subportion. In some embodiments, the cost of the sentence becomes 1-Fact assessment.

Figure 6:
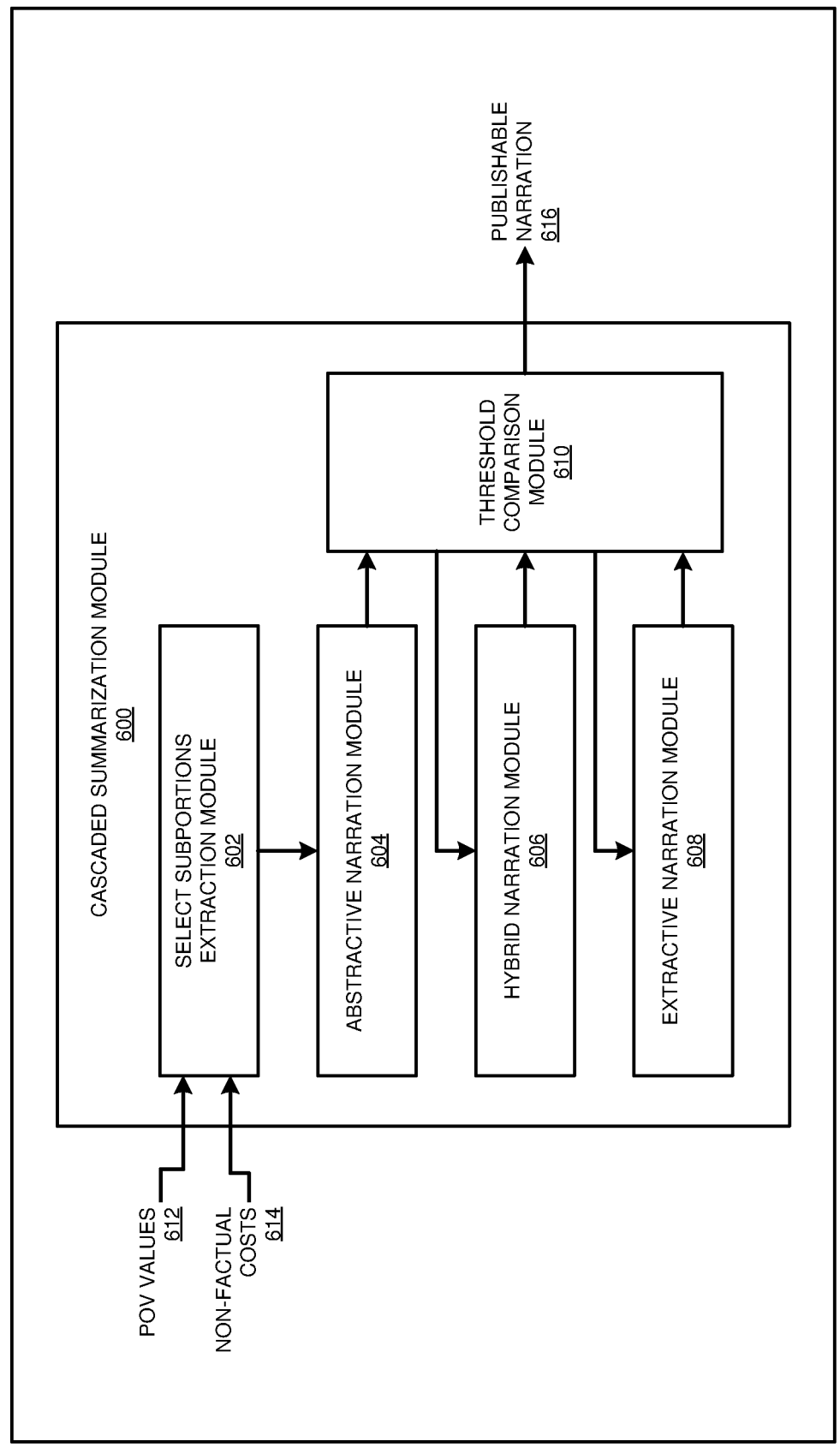
FIG. 6 depicts a block diagram of an example cascaded summarization module in accordance with an illustrative embodiment.

With reference to FIG. 6, this figure depicts a block diagram of an example cascaded summarization module 600 in accordance with an illustrative embodiment. In a particular embodiment, example cascaded summarization module 600 is an example of cascaded summarization module 306 of FIG. 3.

In some embodiments, the cascaded summarization module 600 includes a select subportions extraction module 602, an abstractive narration module 604, a hybrid narration module 606, an extractive narration module 608, and a threshold comparison module 610. In alternative embodiments, the cascaded summarization module 600 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the select subportions extraction module 602 receives the POV value 612, for example as output by the POV analysis module 400, and non-factual cost 614, for example as output by the factual analysis module 500. In some embodiments, the select subportions extraction module 602 also allows a user to input an indication of an amount of risk they are willing to take with respect to non-fact information being included within a summary for a POV.

In the illustrated embodiment, the select subportions extraction module 602 selects from among the multiple extracted subportions of the item of media content for use in generating a summary. In some embodiments, the select subportions extraction module 602 uses an equation inspired by the Maximal Marginal Relevance (MMR) equation shown below as expression (1), which implements a trade-off between non-factual cost and the value of the POV.

$$MMR \stackrel{def}{=} \max_{S_i \in D \backslash Sum} \left[ \lambda(sim_i(S_i, Q)) - \left( (1-\lambda) \max_{S_j \in Sum} sim_2(S_i, S_j) \right) \right] \quad (1)$$

In expression (1), where, Q=non-factual cost, D=Set of subportions of item of media content, S=POV value, D\Sum=set of unselected subportions in D, and λ=a constant in a range of 0 to 1. In some embodiments, λ is dependent on the system because different contexts require different truth values. In some embodiments, the select subportions extraction module 602 runs a knap sack algorithm modified by expression (1) hat trades off the non-factual cost and value of the POV.

In some embodiments, the resulting output from expression (1) is a set of subportions that both maximize the POV value and minimize the non-factual cost. In some embodiments, the number of subportions is related to the maximum non-factual risk the user is willing to take. In some embodiments, the select subportions extraction module 602 outputs a list of subportions associated with a particular point of view, which may be used to synthesize a narration. In the illustrated embodiment, the cascaded summarization module 600 uses a cascade of techniques that run multiple times for each desired POV, which in turn, changes the valuation associated with each subportion.

In the illustrated embodiment, the abstractive narration module 604 generates an abstractive summarization using the subportions output from the select subportions extraction module 602 for each POV. The threshold comparison module 610 then receives the abstractive summarization and applies a fact checking algorithm to the abstractive summarization. Since the original subportions are already traded off with POV value and fact checking, the original sentences may be treated as factual. The threshold comparison module 610 finds the word embedding for the entire abstractive summarization. The threshold comparison module 610 then gathers supporting factual embeddings and includes that within the second set of auto encoder and decoders. The threshold comparison module 610 uses this information to calculate a factual score for the abstractive summarization and compare the factual score to a threshold value, for example a user-selected factual threshold value.

In the illustrated embodiment, if the abstractive summarization satisfies the threshold value, then the threshold comparison module 610 outputs the abstractive summarization to the user, for example by transmitting the abstractive summarization as a publishable narration 616 for display by a user device, (e.g., user device 312 of FIG. 3). On the other hand, if the abstractive summarization does not satisfy the threshold value, then the subportions output from the select subportions extraction module 602 are transmitted to the hybrid narration module 606.

In some embodiments, the hybrid narration module 606 uses an algorithm that uses reinforcement learning to reward sentences that have a mix of extractive base and abstractive base. In some embodiments, the hybrid narration module 606 also uses a factual data store (e.g., fact-based corpora 512 of FIG. 5) to amplify or dampen the reward within the reinforcement policy. The threshold comparison module 610 then receives the hybrid summarization and applies a fact checking algorithm to the hybrid summarization. Since the original subportions are already traded off with POV value and fact checking, the original sentences may be treated as factual. The threshold comparison module 610 finds the word embedding for the entire hybrid summarization. The threshold comparison module 610 then gathers supporting factual embeddings and includes that within the second set of auto encoder and decoders. The threshold comparison module 610 uses this information to calculate a factual score for the hybrid summarization and compare the factual score to a threshold value, for example a user-selected factual threshold value.

In the illustrated embodiment, if the hybrid summarization satisfies the threshold value, then the threshold comparison module 610 outputs the hybrid summarization to the user, for example by transmitting the hybrid summarization as a publishable narration 616 for display by a user device, (e.g., user device 312 of FIG. 3). On the other hand, if the abstractive summarization does not satisfy the threshold value, then the subportions output from the select subportions extraction module 602 are transmitted to the hybrid narration module 606.

In some embodiments, the extractive narration module 608 extracts the most important POVs and aggregates subportions into an extractive narration. In addition, each extracted subportion is tagged with a fact-based score. The threshold comparison module 610 then receives the extractive summarization and applies a fact checking algorithm to the extractive summarization. Since the original subportions are already traded off with POV value and fact checking, the original sentences may be treated as factual. The threshold comparison module 610 finds the word embedding for the entire extractive summarization. The threshold comparison module 610 then gathers supporting factual embeddings and includes that within the second set of auto encoder and decoders. The threshold comparison module 610 uses this information to calculate a factual score for the extractive summarization and compare the factual score to a threshold value, for example a user-selected factual threshold value.

In the illustrated embodiment, if the extractive summarization satisfies the threshold value, then the threshold comparison module 610 outputs the extractive summarization to the user, for example by transmitting the extractive summarization as a publishable narration 616 for display by a user device, (e.g., user device 312 of FIG. 3). On the other hand, if the extractive summarization does not satisfy the threshold value, then the subportions output from the select subportions extraction module 602 are discarded. In alternative embodiments, an extractive summarization is provided to the user for viewing regardless of the factual threshold value. In some such embodiments, if the extractive summarization does not satisfy the threshold value, the extractive summarization is provided to the user for viewing with an indication to the user that the extractive summarization does not satisfy the factual threshold.

In alternative embodiments, the order in which the different summarization techniques are generated may differ from the illustrated embodiment, for example the extractive narration and/or hybrid narration may be prepared before the abstractive narration. Also, in alternative embodiments, alternative narration techniques may be generated in place of, or in addition to, the abstractive, hybrid, and/or extractive summarization techniques. Thus, in some embodiments, the cascaded summarization module 600 performs a cascaded summarization process comprising at least one iteration of generating a summary of the item of media content using the subportion of the item of media content and a summarization technique, where each iteration of the cascaded summarization process uses a different summarization technique from other iterations of the cascaded summarization process; analyzing the summary using a fact-checking algorithm, where the analyzing determines whether the summary satisfies a factual score threshold; and performing a next iteration of the cascaded summarization process while the summary fails to satisfy the factual score threshold and at least one of a predetermined set of summarization techniques remains unused.

Figure 7:
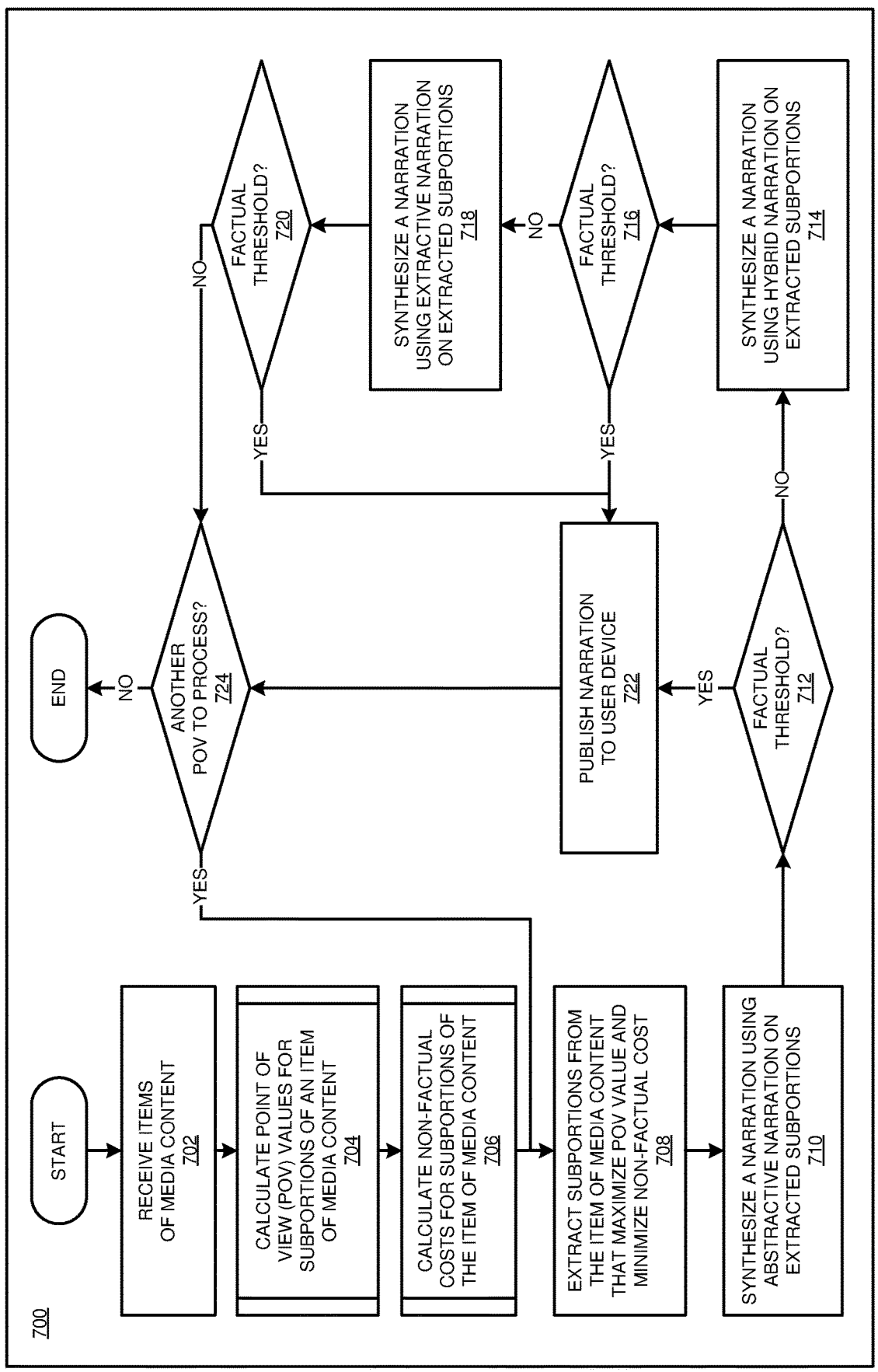
FIG. 7 depicts a flowchart of an example process for media summarization in accordance with an illustrative embodiment.

With reference to FIG. 7 this figure depicts a flowchart of an example process 700 for media summarization in accordance with an illustrative embodiment. In a particular embodiment, the media summarization application 300 of FIG. 3 carries out the process 700.

In an embodiment, at block 702, the process 700 receives items of media content, such as text, audio, images, or video content. In some embodiments, the process 700 receives the media content as a result of the media content being uploaded or transferred by a user or other process. In some embodiments, the process 700 receives the media content in response to a request by the process 700, such as in the form of search results in response to a query by the process 700.

Next, at block 704, the process 700 calculates POV values for subportions of an item of media content.

Next, at block 706, the process 700 calculates non-factual costs for the subportions of the item of media content. Next, at block 708, the process 700 extracts subportions from the item of media content that maximize POV value and minimize non-factual cost.

Next, at block 710, the process 700 synthesizes a narration using abstractive narration on extracted subportions.

Next, at block 712, the process 700 determines whether the abstractive narration satisfies a predetermined factual score threshold. If not, then at block 714, the process 700 synthesizes a narration using hybrid narration on extracted subportions. Next, at block 716, the process 700 determines whether the hybrid narration satisfies the predetermined factual score threshold. If not, then at block 718, the process 700 synthesizes a narration using extractive narration on extracted subportions. Next, at block 720, the process 700 determines whether the extractive narration satisfies the predetermined factual score threshold. If not, then at block 724 the process 700 check for another POV to process, and either processes the next POV or ends if no other POVs remain. If, at block 712, 716 or 720 the process 700 determines that the corresponding narration satisfies the predetermined factual score threshold, the process 700 proceeds to block 722, where the process publishes the narration to a user device.

Figure 8:
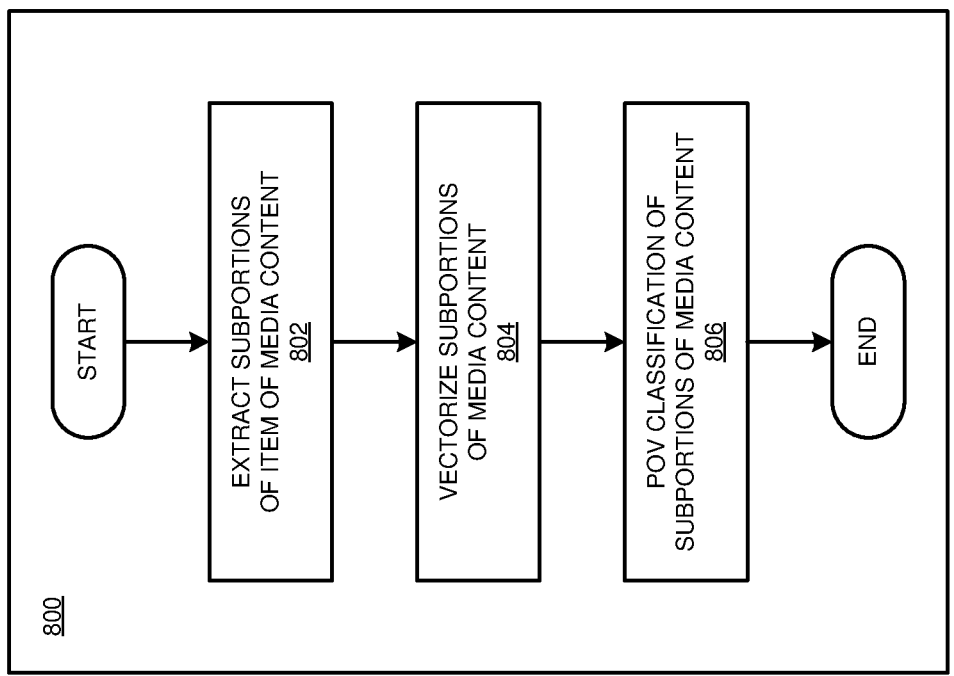
FIG. 8 depicts a flowchart of an example process for POV analysis in accordance with an illustrative embodiment.

With reference to FIG. 8 this figure depicts a flowchart of an example process 800 for POV analysis in accordance with an illustrative embodiment. In a particular embodiment, the POV analysis module 400 of FIG. 4 carries out the process 800.

In an embodiment, at block 802, the process 800 extracts subportions of item of media content. Next, at block 804, the process 800 vectorizes subportions of media content. Next, at block 806, the process 800 determines the POV classification of subportions of media content.

Figure 9:
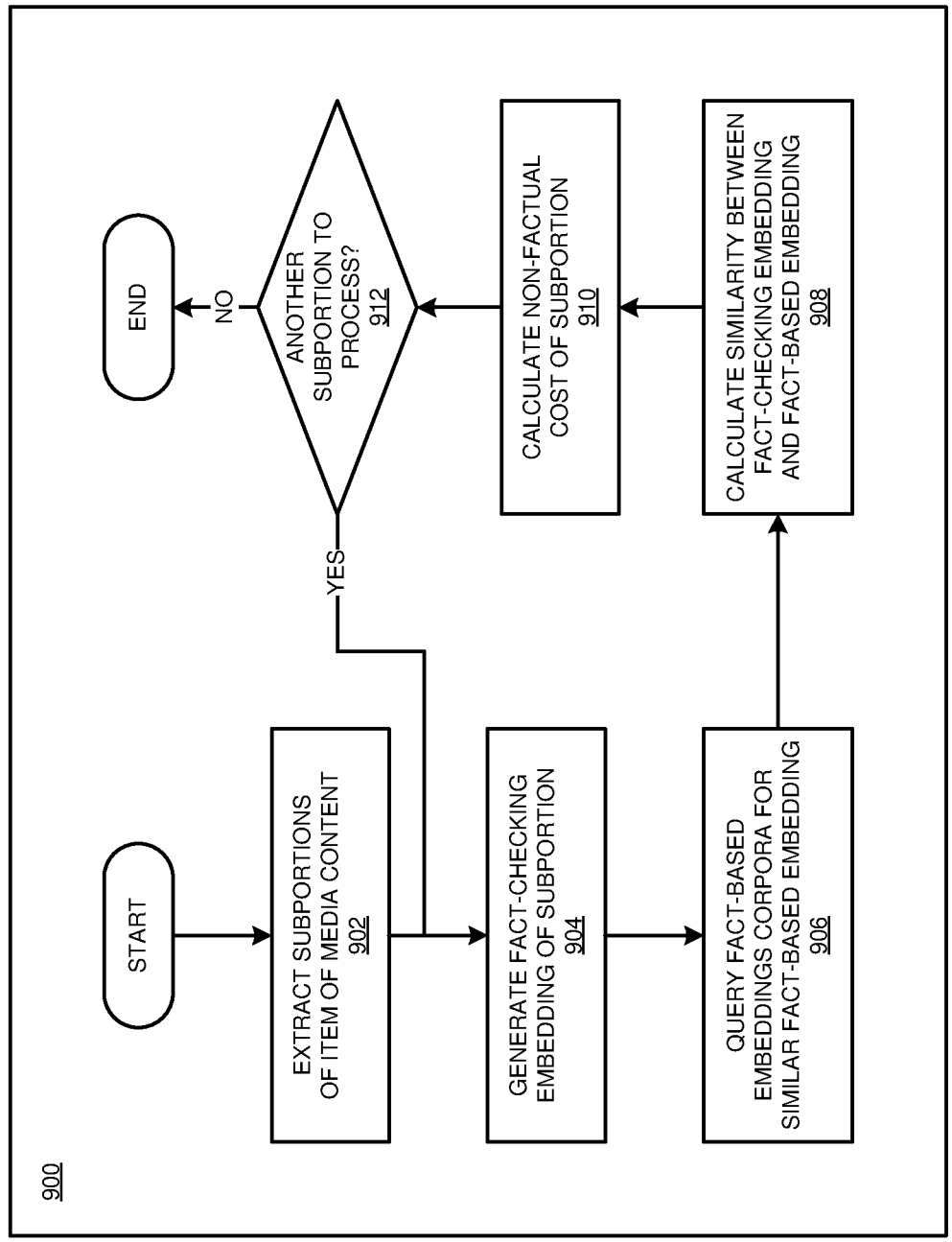
FIG. 9 depicts a flowchart of an example process for factual analysis in accordance with an illustrative embodiment.

With reference to FIG. 9 this figure depicts a flowchart of an example process 900 for factual analysis in accordance with an illustrative embodiment. In a particular embodiment, the factual analysis module 500 of FIG. 5 carries out the process 900.

In an embodiment, at block 902, the process 900 extracts subportions of item of media content. Next, at block 904, the process 900 generates a fact-checking embedding of the subportions. Next, at block 906, the process 900 queries fact-based embeddings corpora for similar fact-based embedding. Next, at block 908, the process 900 calculates a similarity value between the fact-checking embedding and the fact-based embedding. Next, at block 910, the process 900 calculates a non-factual cost of the subportion. Next, at block 912, the process 900 determines if there is another subportion to process. If so, the process returns to block 904 to process the next subportion. Otherwise, the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   detecting a point of view (POV) of a subportion of an item of media content by generating, using a polarity classifier, a distribution of sentiment polarity for the item of media content, and estimating, using a nested deep learning algorithm, a probability of the POV based at least in part on the distribution of sentiment polarity;
   calculating a POV value for the subportion of the item of media content, wherein the calculating of the POV value includes evaluating user inputs related to the detected POV of the subportion of the item of media content;
   calculating a non-factual cost for the subportion of the item of media content indicative of an amount of the subportion of the item of media content that lacks support in a fact-based corpora;
   performing an iterative cascaded summarization process comprising:
     generating a summary of the item of media content using the subportion of the item of media content and a summarization technique,
       wherein each iteration of the cascaded summarization process uses a different summarization technique from other iterations of the cascaded summarization process;
     analyzing the summary using a fact-checking algorithm, wherein the analyzing determines whether the summary satisfies a factual score threshold; and
     determining whether at least one of a predetermined set of summarization techniques remains unused;
     advancing, responsive to determining that at least one of the predetermined set of summarization techniques remains unused, to a next iteration of the cascaded summarization process; and
   communicating, responsive to a summary from any iteration of the cascaded summarization process satisfying the factual score threshold, the summary to a user device in response to an inquiry from the user.

2. The method of claim 1, further comprising:
   determining a degree of importance of the POV to the user based on an amount of time the user spends reviewing material having the POV.

3. The method of claim 1, wherein the calculating of the non-factual cost for the subportion of the item of media content comprises generating a fact-checking embedding of the subportion of the item of media content.

4. The method of claim 3, wherein the calculating of the non-factual cost for the subportion of the item of media content further comprises querying fact-based embeddings corpora for a fact-based embedding that most closely matches the fact-checking embedding of the subportion of the item of media content.

5. The method of claim 4, wherein the calculating of the non-factual cost for the subportion of the item of media content further comprises calculating a similarity between the fact-checking embedding and the fact-based embedding.

6. The method of claim 1, wherein the generating of the summary during a first iteration of the cascaded summarization process comprises generating an abstractive summary.

7. The method of claim 6, wherein the generating of the summary during a second iteration of the cascaded summarization process comprises generating a hybrid summary.

8. The method of claim 7, wherein the generating of the summary during a third iteration of the cascaded summarization process comprises generating an extractive summary.

9. A computer program product comprising one or more computer readable storage media, and program instructions collectively stored on the one or more computer readable storage media, the program instructions executable by a processor to cause the processor to perform operations comprising:
- detecting a point of view (POV) of a subportion of an item of media content by generating, using a polarity classifier, a distribution of sentiment polarity for the item of media content, and estimating, using a nested deep learning algorithm, a probability of the POV based at least in part on the distribution of sentiment polarity;
- calculating a POV value for the subportion of the item of media content, wherein the calculating of the POV value includes evaluating user inputs related to the detected POV of the subportion of the item of media content;
- calculating a non-factual cost for the subportion of the item of media content indicative of an amount of the subportion of the item of media content that lacks support in a fact-based corpora;
- performing an iterative cascaded summarization process comprising:
  - generating a summary of the item of media content using the subportion of the item of media content and a summarization technique,
  - wherein each iteration of the cascaded summarization process uses a different summarization technique from other iterations of the cascaded summarization process;
  - analyzing the summary using a fact-checking algorithm, wherein the analyzing determines whether the summary satisfies a factual score threshold; and
  - determining whether at least one of a predetermined set of summarization techniques remains unused;
  - advancing, responsive to determining that at least one of the predetermined set of summarization techniques remains unused, to a next iteration of the cascaded summarization process; and
- communicating, responsive to a summary from any iteration of the cascaded summarization process satisfying the factual score threshold, the summary to a user device in response to an inquiry from the user.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
- program instructions to meter use of the program instructions associated with the request; and
- program instructions to generate an invoice based on the metered use.

12. The computer program product of claim 9, wherein the calculating of the non-factual cost for the subportion of the item of media content comprises generating a fact-checking embedding of the subportion of the item of media content.

13. The computer program product of claim 9, wherein the generating of the summary during a first iteration of the cascaded summarization process comprises generating an abstractive summary.

14. The computer program product of claim 10, wherein the generating of the summary during a second iteration of the cascaded summarization process comprises generating a hybrid summary.

15. The computer program product of claim 11, wherein the generating of the summary during a third iteration of the cascaded summarization process comprises generating an extractive summary.

16. A computer system comprising a processor and one or more computer readable storage media, and program instructions collectively stored on the one or more computer readable storage media, the program instructions executable by the processor to cause the processor to perform operations comprising:
- detecting a point of view (POV) of a subportion of an item of media content by generating, using a polarity classifier, a distribution of sentiment polarity for the item of media content, and estimating, using a nested deep learning algorithm, a probability of the POV based at least in part on the distribution of sentiment polarity;
- calculating a POV value for the subportion of the item of media content, wherein the calculating of the POV value includes evaluating user inputs related to the detected POV of the subportion of the item of media content;
- calculating a non-factual cost for the subportion of the item of media content indicative of an amount of the subportion of the item of media content that lacks support in a fact-based corpora;
- performing an iterative cascaded summarization process comprising:
  - generating a summary of the item of media content using the subportion of the item of media content and a summarization technique,
  - wherein each iteration of the cascaded summarization process uses a different summarization technique from other iterations of the cascaded summarization process;
  - analyzing the summary using a fact-checking algorithm, wherein the analyzing determines whether the summary satisfies a factual score threshold; and
  - determining whether at least one of a predetermined set of summarization techniques remains unused;
  - advancing, responsive to determining that at least one of the predetermined set of summarization techniques remains unused, to a next iteration of the cascaded summarization process; and
- communicating, responsive to a summary from any iteration of the cascaded summarization process satisfying the factual score threshold, the summary to a user device in response to an inquiry from the user.

17. The computer system of claim 16, wherein the generating of the summary during a first iteration of the cascaded summarization process comprises generating an abstractive summary.

18. The computer system of claim 17, wherein the generating of the summary during a second iteration of the cascaded summarization process comprises generating a hybrid summary.

19. The computer system of claim 18, wherein the generating of the summary during a third iteration of the cascaded summarization process comprises generating an extractive summary.

* * * * *